United States Patent

[11] 3,524,438

| [72] | Inventor | Douglas G. Janisch |
| --- | --- | --- |
| | | Mequon, Wisconsin |
| [21] | Appl. No. | 684,051 |
| [22] | Filed | Nov. 17, 1967 |
| [45] | Patented | Aug. 18, 1970 |
| [73] | Assignee | Tecumseh Products Company |
| | | Tecumseh, Michigan |
| | | a Corp. of Michigan |

[54] IGNITION CIRCUIT
5 Claims, 3 Drawing Figs.

[52] U.S. Cl. ..................................................... 123/148,
123/149, 315/214
[51] Int. Cl. ..................................................... F02p 1/00
[50] Field of Search ........................................... 123/148E,
148AC, 149A, 149C, 149D; 315/205, 209CD, 223

[56] References Cited
UNITED STATES PATENTS

| 3,395,684 | 8/1968 | Minks | 123/148 |
| 3,405,347 | 10/1968 | Swift et al. | 123/148X |
| 3,072,823 | 1/1963 | Kirk | 315/205 |
| 3,240,198 | 3/1966 | Loudon et al. | 123/148(E)UX |
| 3,349,284 | 10/1967 | Roberts | 123/148X |
| 3,358,665 | 12/1967 | Carmichael et al. | 123/148(E)UX |
| 3,367,314 | 2/1968 | Hirosawa et al. | 123/148(E)UX |

*Primary Examiner*— Laurence M. Goodridge
*Attorney*—Barnes, Kisselle, Raisch and Choate

ABSTRACT: A capacitor discharge ignition and manufacturing process for making the same wherein a silicon controlled rectifier is gated by triggering signals from two substantially identical trigger coils having substantially equal air gaps with a magnet on the rotor of a magneto. The trigger signals are time separated and a selected resistor is connected in series with one of the coils to obtain a proper amplitude relationship between the two signals and thereby provide an automatic timing shift from a retarded ignition timing during cranking of the engine to an advanced ignition timing when the engine is running. The resistor is individually matched to each ignition circuit during production.

Patented Aug. 18, 1970

3,524,438

INVENTOR
DOUGLAS G. JANISCH

BY
Barnes, Kisselle, Raisch & Choate
ATTORNEYS

IGNITION CIRCUIT

In a capacitor discharge ignition system of the type used with single cylinder engines and the like, the capacitor can be discharged through a silicon controlled rectifier in response to triggering signals correlated to the engine cycle such that the spark occurs at substantially top dead center at low cranking speeds during starting and the spark is advanced electronically when the engine is running. The advanced ignition timing pulse and the retarded ignition timing pulse can be generated, respectively, by separate trigger coils mounted on the stator of a magneto. The coils are positioned in spaced relationship with the position of the coils being correlated to the engine cycle to produce the advanced and the retarded timing signals at the proper time in the engine cycle. The advanced ignition timing pulse is rendered ineffective at low cranking speeds during starting by using coils having different parameters, as for example, a different number of turns in the coils, or different air gaps for the coils. These dual coil ignition systems operate effectively and provide very easy starting as compared to prior art ignitions having fixed timing or having mechanical timing advance. The ignition systems can be mass produced at a low cost. However it is highly desirable to further reduce manufacturing costs and improve the reliability of such ignition systems, particularly in the small engine field.

Thus the objects of the present invention are to provide an ignition system having automatic ignition timing advance that provides an effective timing shift from engine timing desired when the engine is cranked at low speeds during starting to an engine timing desired at operating speeds; that provides effective easy starting; that is more reliable and can be mass produced more economically compared to ignition systems having automatic ignition advance of the aforementioned type; and that is particularly suited to single-cylinder engines having a magneto and a capacitor discharge type ignition system.

Other objects, features and advantages of the present invention will be apparent in connection with the following description, the appended claims and accompanying drawings in which:

Figure 2:
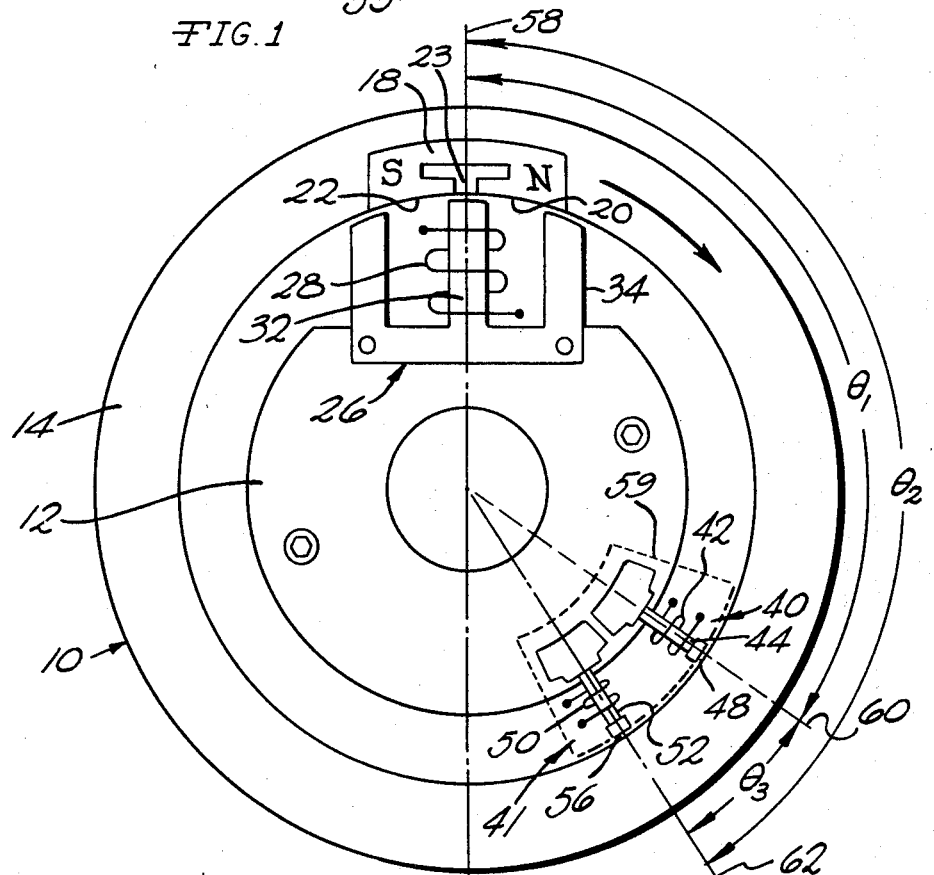
FIG. 2 is a view diagrammatically illustrating a magneto in the ignition circuit of FIG. 1.

Referring more particularly to the drawings, there is illustrated a magneto designated generally at 10 and comprising a stator 12 and a rotor 14 which is drivingly connected to the crankshaft (not shown) of a single cylinder engine to rotate in a clockwise direction as viewed in FIG. 2 in synchronism with the engine. A permanent magnet 18 embedded in rotor 14 has a north magnetic pole face 20 and a south magnetic pole face 22 that extend circumferentially along the inner periphery of rotor 14 with a narrow gap 23 therebetween. The stator 12 is fastened on the engine by suitable means and is stationary relative to rotor 14. Mounted on the stator 12 is a main charging coil assembly 26 which includes a charging coil 28 wound on the center leg 32 of an E-shaped core 34. This arrangement provides a rapid flux reversal in the center leg 32 causing a relatively high voltage to be generated in coil 28. Two trigger coil assemblies 40, 41 are also mounted on stator 12 in spaced relation to each other and to the main coil assembly 26.

The trigger coil assembly 40 generally comprises a coil 42 wound on a core 44. Core 44 projects radially outwardly from stator 12 with the radially outer end of core 44 spaced from the rotor 14 to form an air gap 48 with rotor 14 and magnet 18. Similarly the trigger coil assembly 41 generally comprises a trigger coil 50 wound on a core 52 which projects radially outwardly from stator 12. The radially outer end of the core 52 defines an air gap 56 with the magnet 18. In the preferred embodiment, the coil assemblies are potted in a housing 59 along with other circuit components as will be later described, and the potted housing is fastened on or formed integrally with the stator 12. The angular displacement between the axis 58 of the charging coil 28 and the axis 60 of the trigger coil 42 is designated $\theta_1$ whereas the corresponding angular displacement in the axis 62 of the coil 50 is designated $\theta_2$ and the angular displacement between the axes 60, 62 is designated $\theta_3$. $\theta_1$ and $\theta_2$ may also be considered as representing crankshaft angles and time. In general the location, $\theta_1$, of the trigger coil 42 is correlated to the engine cycle to provide an advanced ignition timing when the engine is running and the location, $\theta_2$, of the trigger coil 50 is correlated to the engine cycle to provide retarded ignition timing when the engine is cranked at low speeds during starting.

Figure 1:
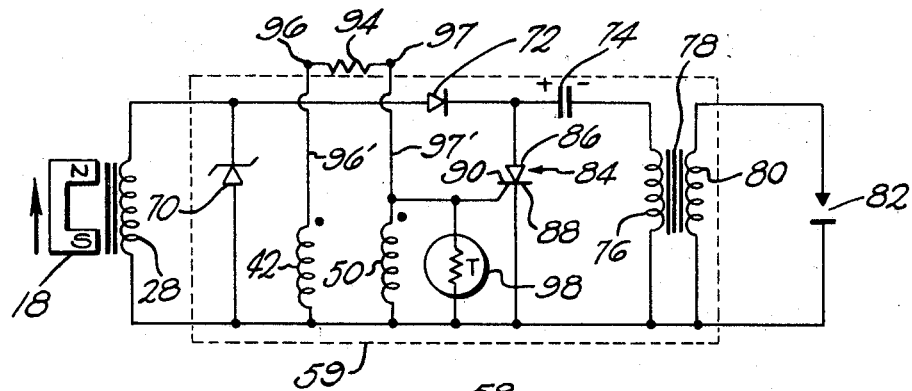
FIG. 1 is a circuit diagram of solid state, capacitor discharge ignition having an improved dual coil triggering circuit.

Referring more particularly to the circuit in FIG. 1, a Zener diode 70 is connected directly across the charging coil 28 to clamp the maximum positive voltage generated in coil 28 when the upper terminal of coil 28, as viewed in FIG. 1, is positive. Also connected across the charging coil 28 is a series circuit comprising a silicon diode 72, a capacitor 74 and a primary winding 76 of an ignition transformer 78. The secondary winding 80 of transformer 78 is connected directly across the spark plug 82. Connected directly across the series connected capacitor 74 and winding 76 is a silicon controlled rectifier 84 having an anode 86, a cathode 88 and a gate electrode 90. The trigger coil 50 is connected directly across the gate and cathode of the rectifier 84. The other trigger coil 42 is connected in series with a resistor 94 with the serially connected coil 42 and resistor 94 being in paralled with coil 50 across the gate 90 and cathode 88 of rectifier 84. Coils 42, 50 are connected in the gate circuit of rectifier 84 to have the same relative polarity as indicated by the dots in FIG. 1. In the preferred embodiment, that portion of the circuit of FIG. 1 enclosed by dashed lines 95 is potted in housing 59 and the connection of resistor 94 in the circuit of FIG. 1 is via terminals 96, 97 located on the outside of housing 59. Coils 42, 50 are connected to terminals 96, 97 via suitable leads 96', 97'.

In the preferred embodiment of the present invention, the coil assemblies 40, 41, particularly coils 42, 50, are identical within manufacturing tolerances and hence the trigger coil assemblies have substantially identical parameters and characteristics. The trigger coil assemblies 40, 41 are mounted on the stator 12 so as to have substantially identical air gaps 48, 56, respectively, with magnet 18. As will later be described in greater detail in connection with FIG. 3, the value of the resistor 94 is selected so that at cranking speeds during starting the advanced ignition timing pulse generated in coil 42 is substantially below the gate voltage required to fire rectifier 84 and hence is ineffective whereas at running speeds the voltage generated in 42 will fire rectifier 84. The retarded ignition timing pulse generated in the coil 50 has an amplitude at cranking speeds during starting and at running speeds that is sufficient to fire the rectifier 84. However at running speeds, the pulse from coil 50 has no effect since capacitor 74 will have been discharged in response to the pulse from coil 42.

Also connected across gate 90 and cathode 88 of rectifier 84 is a thermistor 98 having a negative temperature coefficient so that its resistance decreases with increasing temperature. The thermistor 98 provides compensation for variations in the critical gate-cathode voltage of rectifier 84 with increasing temperatures and minimizes spurious triggering due to stray flux at high engine speeds. Thermistor 98 is selected based on the voltage generated in the coil 42 at running speeds, the value of resistor 94 and the temperature characteristics of the gate-cathode of the rectifier 84 so that with increased temperature, the gate voltage developed across thermistor 98 decreases corresponding to decreases with increasing temperature in the critical gate voltage of rectifier 84.

Figure 3:
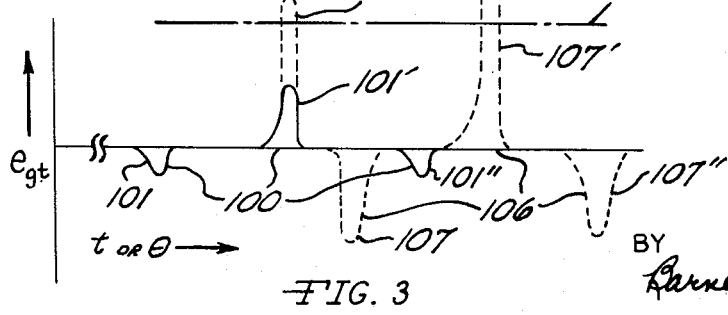
FIG. 3 is a diagram illustrating the waveforms of timing voltages generated in the trigger coils of FIGS. 1 and 2.

The operation of the ignition system described hereinabove can best be understood in connection with the waveforms illustrated in FIG. 3 wherein crankshaft angles are plotted along the abscissa axis and gate voltage magnitudes are plotted along the ordinate axis. The abscissa axis can also be considered as representing time at different scales for different engine speeds. It will be understood that the waveforms illustrated in FIG. 3 are for purposes of explanation and are not necessarily intended to be to scale. When the engine is turned at a relatively low cranking speed during starting, as magnet 18 sweeps past the charging coil 28, the alternating voltage generated in coil 28 is rectified by diode 72 to charge capacitor 74 to the polarity indicated in FIG. 1. As magnet 18 continues to rotate in a clockwise direction as viewed in FIG. 2, the magnet sweeps past the advanced ignition timing coil 42 and generates an alternating signal therein which, due to the voltage drop across resistor 94, has a waveform 100, shown in full lines (FIG. 3), when applied to gate 90. The signal 100 comprises three pulses 101, 101' and 101'' of alternating polarity. Coil 52 is connected to gate 90 so that the first pulse 101 is negative, the second pulse 101' is positive and the third pulse 101'' is negative. In the preferred embodiment being described only the positive pulse 101' is utilized. Pulse 101' is generated when gap 23 passes core 44. The critical gate voltage required to fire rectifier 84 is designated by the voltage level 102. At cranking speed the peak amplitude of the pulse 101' is substantially below the critical gate voltage level 102 and hence is ineffective to fire the rectifier 84. As magnet 18 continues past the trigger coil 50, an alternating signal 106, shown in dashed lines, is generated in the trigger coil 50, and applied to the gate 90 of rectifier 84. The signal 106 also includes a first negative pulse 107, a second positive pulse 107' and a third negative pulse 107''. At cranking speed pulse 107' exceeds the critical level 102 to fire rectifier 84 and initiate discharge of the capacitor 74. The capacitor 74 discharges on half cycles of one polarity through the rectifier 84 and on opposite polarity half cycles through the diodes 70, 72 in a damped oscillatory manner. The duration of the pulse 107' is sufficient to allow the capacitor 74 to substantially fully discharge. The crankshaft angle $\theta_2$ (location of the trigger coil 50), is correlated to the engine cycle so that the retarded ignition timing pulse 107' fires rectifier 84 at the desired crankshaft angle to facilitate easy starting, for example, at or near top dead center in the compression stroke.

As soon as the engine starts, the voltage generated in coil 42 will increase substantially. Hence at running speed the first positive pulse 111' in the gate voltage from coil 42, corresponding to pulse 101', exceeds the critical level 102 at the crankshaft angle $\theta_1$. Pulse 111' fires rectifier 84 to initiate discharge of the capacitor 74. The location, $\theta_1$, of coil 50 is selected so that the advanced ignition timing pulse 111' occurs at the desired carnkshaft angle at running speeds, for example, at an angle of approximately 20° before top dead center. Although the amplitude of the retarded ignition timing pulse corresponding to pulse 107' is also increased substantially at running speeds, the retarded ignition timing signal is ineffective since capacitor 74 is substantially fully discharged in response to the advanced ignition timing pulse 111'. The crankshaft angle $\theta_1$ is selected for optimum performance at normal running speeds and will be a compromise between optimum timing for maximum speeds and for idle speeds. This is not a serious disadvantage for most uses of single-cylinder engines where the timing shift is desired primarily to facilate easy starting. Additionally such engines are run over a relatively narrow speed range for many applications.

Ignition circuits described hereinabove can be mass produced at low manufacturing cost and will provide reliable and uniform operation as between individual circuits. Since the coils 42, 50 are of the same type and the coil assemblies 40, 41 have substantially identical characteristics, substantial manufacturing cost reductions are achieved. Utilizing only one type of coil minimizes purchasing costs and inventory problems. In production, the ignition circuit is completely assembled, except for the conneciton of resistor 94 to the terminals 96, 97 and then potted or encapsulated in housing 59 and mounted on stator 12. The use of a single type of coil for both of the coils 42, 50 facilitates assembly of the two coils in the circuit.

With the magneto assembled except for the connection of resistor 94, the magneto is driven on a test stand while an assembly line worker selects a particular resistor for connection to terminals 96, 97. The value of a particular resistor 94 is chosen to obtain the required amplitude relationship for pulses 101', 111' at cranking speed and at running speed, respectively, and to obtain the required amplitude relationship between pulse 101' and pulse 107' at cranking speed. A ratio of less than one to five between the peak amplitude of pulses 101' and 107' provides sufficient amplitude separation and is preferred. Assembly line selection of a particular resistor for connection to terminals 96, 97 can be accomplished effectively using six to ten standard resistors having graduated values. The standard resistors are incorporated in suitable semi-automated test equipment for temporary insertion into the circuit while the triggering signals are monitored on an oscilloscope. After the best value for resistor 94 is selected, a resistor having that value is soldered to terminals 96, 97. Thus, in effect, each ignition circuit is matched to the magneto as the last step in production. This permits a final adjusting step to compensate for variations in the different circuit components and for variations in the assembly of the components, as for example, variations in the air gaps 48, 56, resulting in uniformity between circuits and hence interchangeability.

Although in the perferred embodiment pulses 107' and 111' are utilized, it will be apparent that other pulse pairs can also be used. For example, by reversing the coil leads the first pulses corresponding to pulses 101 and 107 will be positive and have the desired time separation. However pulses 107' and 111' are preferred since higher amplitudes are generated at cranking speed using smaller coils.

By way of example, on engines in the 2.5-7 horespower range, a typical cranking speed is in the range of 300-400 RPM with minimum cranking speeds of 100-150 RPM and a typical idle speed is above 1500 RPM. The circuit is designed to provide a timing shift in a speed range of 800-1000 RPM. Ignition timing is at approximately top dead center at cranking speed with a 20° advance before top dead center at speeds above 800-1000 RPM. This timing advance provides very easy starting and acceptable engine performance.

It will be understood that the ignition system having automatic timing advance and the method of producing such a circuit have been described hereinabove for purposes of illustration and are not intended to indicate limits of the present invention, the scope of which is defined in the following claims:

I claim:

1. An ignition system of the capacitor discharge type for igniting a combustible charge in an internal combustion engine having at least one cylinder therein comprising a source of electrical energy, a storage capacitor connected to said source to charge said capacitor, an ignition transformer having a primary winding and a secondary winding, at least one spark device electrically coupled to said secondary winding, and circuit means for discharging said capacitor through said primary winding comprising electronic switch means having an output terminal, an input terminal and a common terminal, a first trigger coil connected across said input terminal and said common terminal at all engine speeds, a second trigger coil connected in series with a resistive impedance means across said input terminal and said common terminal at all engine speeds, said resistive impedance means being symmetrical and having a fixed resistance value, and wherein said ignition system further comprises a magnet rotatable relative to said first and said second trigger coils in synchronism with the engine and disposed to sequentially sweep past said second coil and then said first coil to thereby generate at both engine cranking speeds and engine running speeds a second signal in said second coil and a first signal in said first coil, said first and said second signals having a predetermined phase displacement therebetween at said engine cranking speeds correlated to a timing shift between said cranking speeds and said running speeds of said engine, said first trigger coil and said second trigger coil are identical within manufacturing tolerances, and wherein said resistive impedance means has a value such that when the engine is cranked at low speeds during starting said second signal applied to said input terminal from said second coil is below a critical value required to actuate said switch means and said first signal applied to said input terminal from the first coil exceeds said critical value to actuate said switch means and initiate discharge of said capacitor and such that when said engine is running said second signal applied to said input terminal from said second coil exceeds said critical value to actuate said switch means and initiate discharge of said capacitor.

2. An ignition system of the capacitor discharge type for igniting a combustible charge in an internal combustion engine having at least one cylinder therein comprising a source of electrical energy, a storage capacitor connected to said source to charge said capacitor, an ignition transformer having a primary winding and a secondary winding, at least one spark device electrically coupled to said secondary winding, and circuit means for discharging said capacitor through said primary winding comprising electronic switch means having an output terminal, an input terminal and a common terminal, a first trigger coil connected across said input terminal and said common terminal at all engine speeds, a second trigger coil connected in series with a resistive impedance means across said input terminal and said common terminal at all engine speeds, said resistive impedance means being symmetrical and having a fixed resistance value, and wherein said ignition system further comprises a magnet rotatable relative to said first and said second trigger coils in synchronism with the engine and disposed to sequentially sweep past said second coil and then said first coil to thereby generate at both engine cranking speeds and engine running speeds a second signal in said second coil and a first signal in said first coil, said first and said second signals having a predetermined phase displacement therebetween at said engine cranking speeds correlated to a timing shift between said cranking speeds and said running speeds of said engine, said first trigger coil is wound on a first core, said second trigger coil is wound on a second core magnetically separated from said first core, said first and said second cores have first and second air gaps, respectively, with said magnet, said first air gap is substantially equal to said second air gap, and said first and said second trigger coils have substantially the same number of turns so that the open circuit voltage generated in said first coil has a waveform substantially identical to the wave form of the open circuit voltage generated in said second coil but displaced in phase therefrom by an angle corresponding to said timing shift, and wherein said resistive impedance means has a value such that when the engine is cranked at low speeds during starting said second signal applied to said input terminal from said second coil is below a critical value required to actuate said switch means and said first signal applied to said input terminal from the first coil exceeds said critical value to acutate said switch means and initiate discharge of said capacitor and such that when said engine is running said second signal applied to said input terminal from said second coil exceeds said critical value to actuate said switch means and initiate discharge of said capacitor.

3. The ignition system set forth in claim 2 wherein said resistive impedance means has a value such that said first signal has a peak amplitude at said low cranking speeds of at least five times greater than the corresponding peak amplitude of said second signal at said low cranking speeds.

4. The ignition system set forth in claim 1 wherein said first and said second trigger coils are encapsulated in potted material and further comprising first and second terminals accessible from the exterior of said potting material and electrically coupled, respectively, to said first coil and to said second coil, and wherein said resistive impedance means comprises a resistor connected between said first and second terminals exteriorly of said potting material.

5. The ignition system set forth in claim 1 wherein said source of electrical energy comprises a magneto including a rotor member and a stator member, said rotor member being adapted to be driven in synchronism with said engine, said magnet is mounted on one of said members, and said first and said second trigger coils are mounted on said other of said members at locations displaced from each other along the direction of relative rotation between said members at an angle on the order of twenty degrees.